United States Patent [19]
Cunningham

[11] Patent Number: 4,895,041
[45] Date of Patent: Jan. 23, 1990

[54] DUAL TRAVEL CABLE CONTROL SYSTEM

[75] Inventor: Barbara A. Cunningham, Royal Oak, Mich.

[73] Assignee: Babcock Industries Inc., Fairfield, Conn.

[21] Appl. No.: 283,461

[22] Filed: Dec. 12, 1988

[51] Int. Cl.[4] ................................................ F16C 1/10
[52] U.S. Cl. .................................... 74/502.4; 74/502.6
[58] Field of Search .................... 74/500.5, 501.6, 502, 74/503, 502.4, 513, 501.5 R, 479, 502.5, 502.6

[56] References Cited

U.S. PATENT DOCUMENTS

| | | | |
|---|---|---|---|
| 1,993,907 | 3/1935 | Williams | 74/502.6 |
| 2,966,328 | 12/1960 | Burnworth | 74/513 |
| 3,135,130 | 6/1964 | Bentley | 74/501.6 X |
| 3,395,591 | 8/1968 | Shaeffer | 74/501.6 |
| 3,513,719 | 5/1970 | Tschanz | 74/502.6 |
| 3,516,299 | 6/1970 | Conrad | 74/501.6 |
| 3,665,784 | 5/1972 | Bennett | 74/502.6 |
| 4,369,856 | 1/1983 | Nudd | 74/479 X |
| 4,790,206 | 12/1988 | Thomas | 74/500.5 |

FOREIGN PATENT DOCUMENTS

| | | | |
|---|---|---|---|
| 719747 | 2/1932 | France | 74/502.4 |
| 779083 | 3/1935 | France | 74/502.4 |
| 20236 | of 1913 | United Kingdom | 74/501.6 |
| 445408 | 4/1936 | United Kingdom | 74/502.6 |

*Primary Examiner*—Rodney M. Lindsey
*Attorney, Agent, or Firm*—Barnes, Kisselle, Raisch, Choate, Whittemore & Hulbert

[57] ABSTRACT

A dual travel cable control system for use in an environment such as a throttle body wherein movement is provided through dual actuators such as a cruise control cable strand or a manually operated cable strand comprising an assembly of a first tube to which a strand end is connected for relative motion in tension and lost motion in the other and a second element adapted to close the tubular element after assembly of the strand to the first tubular element for attachment to the actuator of one of the devices.

7 Claims, 2 Drawing Sheets

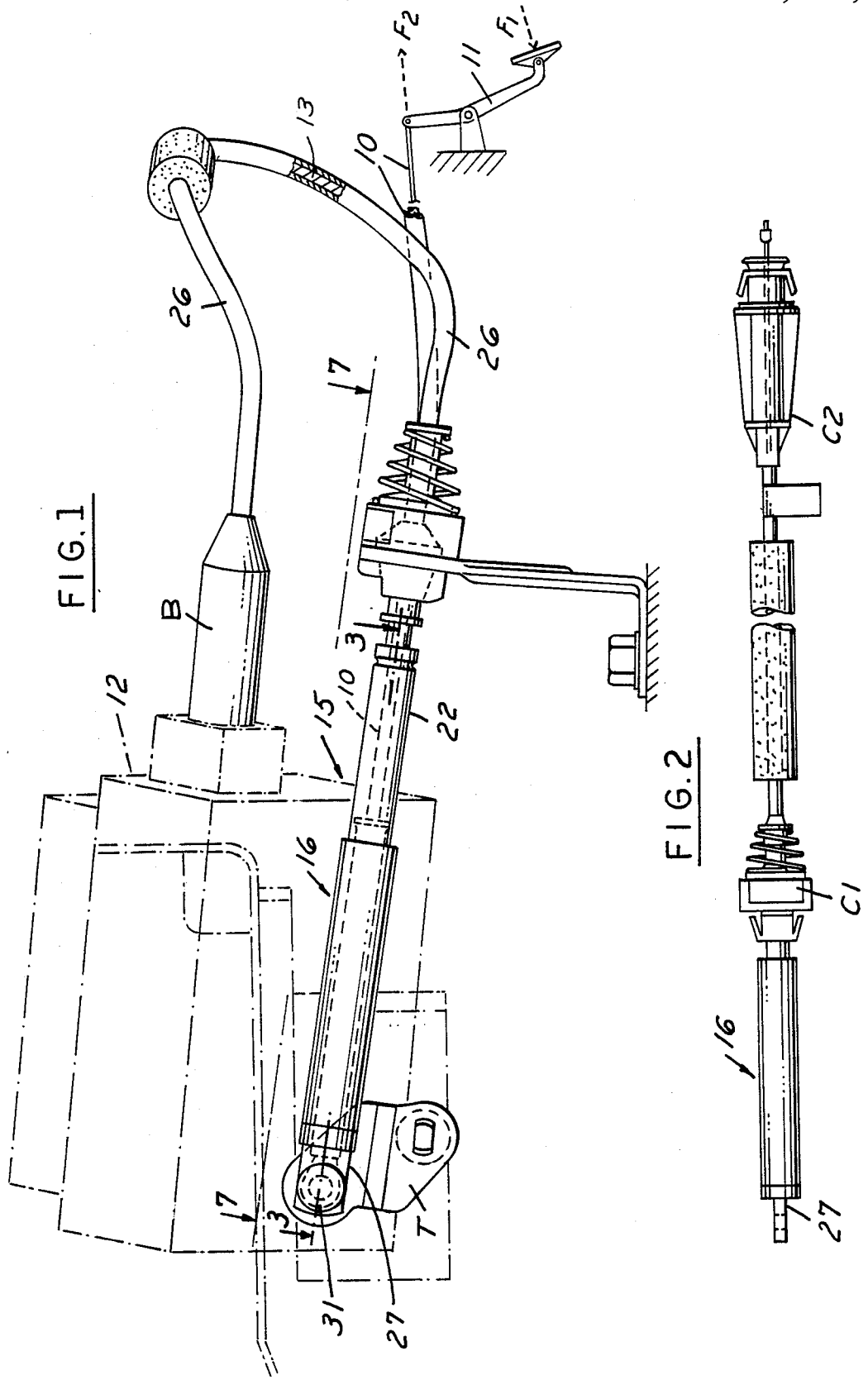

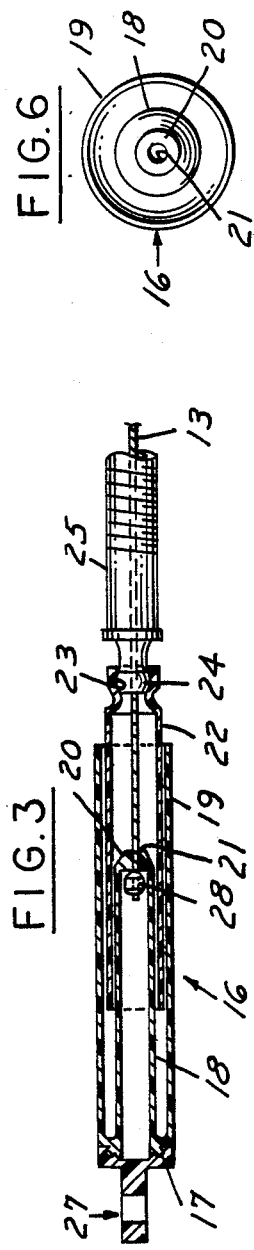
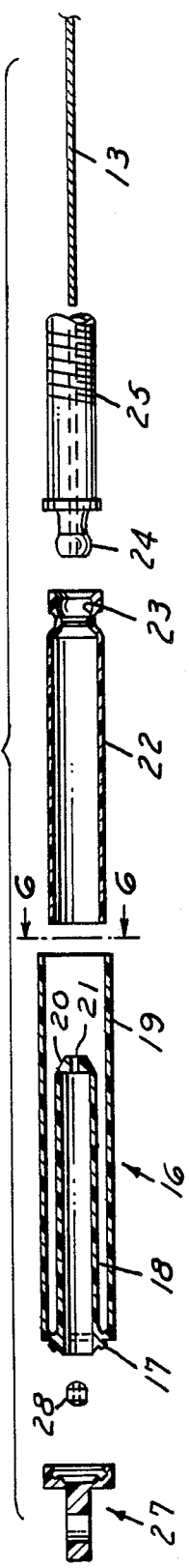
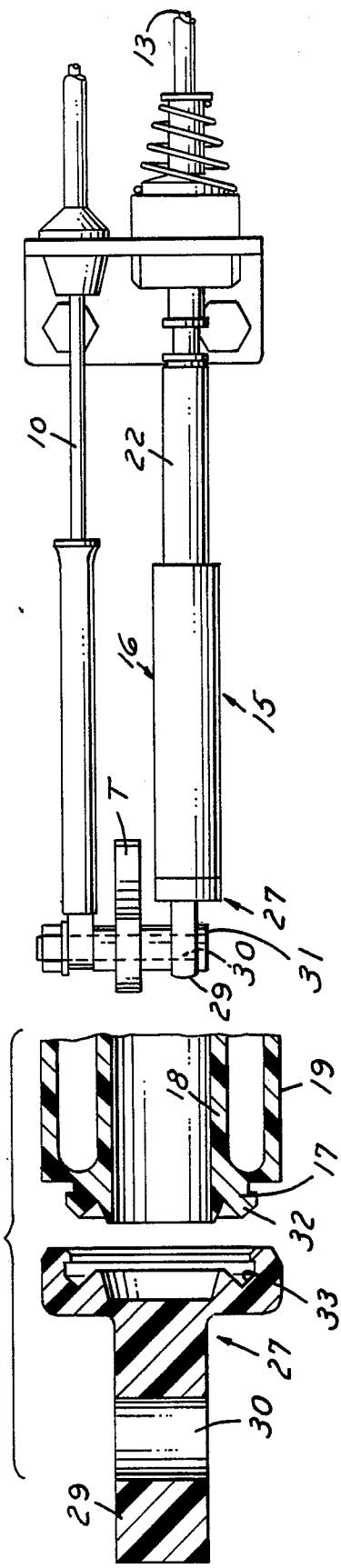

DUAL TRAVEL CABLE CONTROL SYSTEM

This invention relates to dual travel cable control systems.

BACKGROUND AND SUMMARY OF THE INVENTION

In various cable control systems, it is often desirable to provide dual controls, that is, control of a device by first cable and also by a second cable wherein one control maybe operable at any one time. A typical situation for such a dual control system is that wherein a throttle control element of an automotive engine is operated by a manually controlled cable strand from the throttle pedal and may also be operated selectively by a cable strand from a cruise control which is selectively energized. In such an arrangement, it is common to provide a lost motion control in the cable that extends between the throttle element and the cruise control as, for example, by a lever arrangement of a slot and pin operable in the slot to provide a lost motion. When the cruise control is not energized, the manually operated cable strand controls the movement of the throttle. When the cruise control is energized, the cable strand of the cruise control takes up the lost motion and controls the throttle element.

Among the problems with such an arrangement is that it is not readily protectable from the environment such as water and the like especially when mounted in certain positions that are exposed to the environment. In addition such arrangements require a specific orientation and can be adversely affected by temperature conditions as well as the elements of the environment.

Accordingly among the objectives of the this present invention are to provide a dual travel cable control system which allows both a cycling motion as well as a lost travel motion within a limited gage length; which can be assembled and provide a waterproof construction; which can be mounted in various angular orientations to accommodate the construction of the vehicle or the like on which it is mounted; and which can be used at various operating temperatures.

In accordance with the invention, the dual travel cable control system for use in an environment such as a throttle body wherein movement is provided through dual actuators such as a cruise control cable strand or a manually operated cable strand comprises an assembly of a first tube to which a strand end is connected for relative motion in tension and lost motion in the other and a second element adapted to close the tubular element after assembly of the strand to the first tubular element for attachment to the actuator of one of the devices.

DESCRIPTION OF THE DRAWINGS

FIG. 1 is a partly schematic elevational view of a dual travel cable control system embodying the invention.

FIG. 2 is an plan view of a portion of the system before application to a vehicle.

FIG. 3 is a fragmentary sectional view taken along the line 3—3 in FIG. 1.

FIG. 4 is a exploded view on an enlarged scale of a portion of the system shown in FIG. 3.

FIG. 5 is a fragmentary sectional view an enlarged scale of a portion of the system.

FIG. 6 a view taken along the line 6—6 in FIG. 4.

FIG. 7 is a fragmentary plan view of the system shown in FIG. 1.

DESCRIPTION

Referring to FIGS. 1–7 there is shown an arrangement of a throttle element T which can be found, for example, in an automotive vehicle and is adapted to be operated by a cable strand 10 that extends to a throttle pedal 11. The throttle element T is also adapted to be actuated by a cruise control 12 which includes a second cable strand 13 that is adapted upon energization of the cruise control to move the lever T. In order to make the cruise selectively operable, a lost motion connection is normally provided between the throttle lever T and the cable 13. In the present invention, this connection is provided by a mechanism 15.

In accordance with the present invention, this mechanism 15 comprises a first plastic tubular element 16, made of heat resistant plastic such as nylon, that includes an end wall 17 and an inner tubular wall 18 and an outer tubular wall 19 extending axially away from the end wall 17. The inner tubular wall 18 extends axially away from end wall 17 and includes an end wall 20 having an axial opening 21 at the end opposite end wall 17. The device 15 further includes a second plastic tubular element 22, made of heat resistant plastic such as nylon, that is adapted to telescope between the tubular elements 18, 19, as presently described. One end of the tubular element 22 is formed with a spherical socket 23 for receiving the spherical end 24 of a connecter tube 25 to which the conduit 26 surrounding the cable strand 13 is attached. A cap member 27 is adapted to be connected to the end wall 17 as presently described. A thermal insulating boot B may be provided on conduit 26.

The cable strand 13 is assembled to the device 15 by first threading the cable strand 13 through the opening 21 and crimping an element 28, such as a die cast element, to the cable strand providing a two way tension connection between the cable strand 13 and the tubular element 16, after the tubular element 22 is positioned on the fitting 25. The cap member 27 is then engaged with the end wall 17 and fixed thereto preferably by spin welding. As shown in FIG. 5, the cap member 27 preferably includes an axial projection 29 having a transverse opening 30 for facilitating attachment of the cap member 27 to the throttle lever T by a pin 31 that extends though the opening 29.

As further shown in FIG. 5, the end wall 17 preferably includes an annular projection 32 that extends into an annular seat 33 in the cap 27. Connectors C1 and C2 of known construction such as shown in U.S. Pat. No., 4,621,937 are connected to the assembly. The subject matter of U.S. Pat. No. 4,621,937 is incorporated herein by reference.

The assembly of the device 15 and associated cable strand 13 and conduit 26 can be handled stored and delivered to the ultimate user as an assembly, as shown in FIG. 2.

When assembled as shown in FIG. 1, the assembly provides a dual travel cable control system wherein control of throttle element T can be provided either by the stand 10 or by the strand 13. The assembly when attached is oriented within the cap 27 higher than conduit fitting 25 thereby insuring that water and the like will not enter the mechanism 15.

It can thus be seen that there has been provided a dual travel cable control system which allows both a cycling motion as well as a lost travel motion within a limited gage length; which can be assembled and provide a waterproof construction; which can be mounted in various angular orientations to accommodate the construction of the vehicle or the like on which it is mounted; and which can be used at various operating temperatures.

I claim:

1. A dual travel cable control system for use in moving a device by a cable comprising an assembly of a first tubular element to which a strand end of the cable is connected for relative motion in tension in one direction and lost motion in the other direction and a second element adapted to close the tubular element after assembly of the strand to the first tubular element for attachment to an actuator of the device said first tubular element having an inner and outer wall, said inner wall having a transverse wall closing the space between the inner and outer walls and an end wall having an opening therethrough such that a cable may be extended through the opening in the end wall of the inner wall and a stop element mounted on the portion of the cable within the inner wall, a second tubular element telescoped between said inner and outer walls of said first tubular element, a fitment adapted to be connected to a conduit surrounding the cable, said fitment engaging said second tubular element, said second element comprising a cap mounted and fixed on the transverse wall of the first tubular element and closing the open end of the inner wall and adapted to be engaged with the device to be moved.

2. The system set forth in claim 1 wherein said cap element is spin welded to said first tubular element.

3. The system set forth in claim 1 including a swivel connection between said second tubular element and said fitment.

4. The system set forth in claim 1 wherein said element to be moved comprises a throttle element.

5. The system set forth in claim 1 wherein said tubular elements are made of plastic.

6. The system set forth in claim 1 wherein said tubular elements are made of heat resistant plastic.

7. Tubular element set forth in claim 1 wherein said tubular elements are made of nylon.

* * * * *